(12) United States Patent
Sharma et al.

(10) Patent No.: US 10,769,428 B2
(45) Date of Patent: Sep. 8, 2020

(54) ON-DEVICE IMAGE RECOGNITION

(71) Applicant: Google LLC, Mountain View, CA (US)

(72) Inventors: Abhanshu Sharma, Zurich (CH); Fedir Zubach, Zürich (CH); Thomas Binder, Lübeck (DE); Lukas Mach, Kilchberg (CH); Sammy El Ghazzal, Zurich (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 213 days.

(21) Appl. No.: 16/101,594

(22) Filed: Aug. 13, 2018

(65) Prior Publication Data

US 2020/0050846 A1 Feb. 13, 2020

(51) Int. Cl.
| | |
|---|---|
| *G06F 16/387* | (2019.01) |
| *G06F 16/587* | (2019.01) |
| *G06K 9/00* | (2006.01) |
| *G06N 3/02* | (2006.01) |
| *G06N 3/08* | (2006.01) |
| *G06N 20/00* | (2019.01) |

(Continued)

(52) U.S. Cl.
CPC ..... *G06K 9/00456* (2013.01); *G06K 9/00476* (2013.01); *G06K 9/6256* (2013.01); *G06N 3/08* (2013.01); *G06N 5/00* (2013.01); *G06N 20/00* (2019.01); *G06F 16/387* (2019.01); *G06F 16/587* (2019.01); *G06N 3/02* (2013.01)

(58) Field of Classification Search
CPC ...... G06F 15/18; G06F 16/387; G06F 16/587; G06K 9/00456; G06K 9/00476; G06K 9/6256; G06N 3/02; G06N 3/08; G06N 5/00; G06N 20/00
See application file for complete search history.

(56) References Cited

U.S. PATENT DOCUMENTS

| | | | |
|---|---|---|---|
| 6,026,358 A | * 2/2000 | Tomabechi | G10L 15/16 704/232 |
| 9,542,948 B2 | * 1/2017 | Roblek | G10L 17/005 |
| 2008/0082549 A1 | * 4/2008 | Baker | G06F 16/248 |

(Continued)

OTHER PUBLICATIONS

Hinton et al. ("Distilling the Knowledge in a Neural Network," arXiv.org:1503.02531, submitted Mar. 9, 2015) (Year: 2015).*

(Continued)

*Primary Examiner* — Yubin Hung
(74) *Attorney, Agent, or Firm* — Doirty & Manning, PA

(57) ABSTRACT

Methods, systems, and apparatus, including computer programs encoded on a computer storage medium, for training a second model to approximate the output of a first model to classify, according to a classification scheme, image data received as input, and after the second model is trained accessing map data that specifies a plurality of geographic locations, and for each geographic location associated with an entity for each image of the one or more images that depict the entity located at the geographic location, providing the image to the second model to generate an embedding for the image, associating each of the one or more embeddings generated by the second model with the geographic location, and storing, in a database, location data specifying the geographic location, the associated one or more embeddings, and data specifying the entity, as an associated entity entry for the entity.

20 Claims, 7 Drawing Sheets

(51) Int. Cl.
  *G06K 9/62* (2006.01)
  *G06N 5/00* (2006.01)

(56) References Cited

U.S. PATENT DOCUMENTS

| | | | | |
|---|---|---|---|---|
| 2010/0305844 | A1* | 12/2010 | Choi | G01C 21/3423 701/533 |
| 2013/0261969 | A1* | 10/2013 | Nakamura | G06T 11/00 701/533 |
| 2016/0275350 | A1* | 9/2016 | Raynaud | G06K 9/4604 |
| 2016/0334969 | A1* | 11/2016 | Reckhow | G06Q 50/01 |
| 2018/0012107 | A1* | 1/2018 | Xu | G06K 9/6267 |

OTHER PUBLICATIONS

Bruns et al. ("Adaptive training of video sets for image recognition on mobile phones," Pers Ubiquit Computing (2009) 13:165-178) (Year: 2009).*

Takacs et al. ("Outdoors augmented reality on mobile phone using loxel-based visual feature organization," Proceedings of the First ACM International Conference on Multimedia Information Retrieval, Oct. 30, 2008, pp. 427-434) (Year: 2008).*

George Seif ("Deep Learning for image Recognition: why it's challenging, where we've been, and what's next," Jan. 21, 2018; retrieved from the Internet) (Year: 2018).*

Ujjwal Upadhyay ("Knowledge Distillation," Apr. 5, 2018; retrieved from the Internet) (Year: 2018).*

Chen et al. ("Learning Efficient Object Detection Models with Knowledge Distillation," Advances in Neural Information Processing Systems 30 (NIPS 2017), pp. 742-751 (Year: 2017).*

Bruns Et Al, "Adaptive Training of Video Sets for Image Recognition on Mobile Phones", Personal and Ubiquitous Computing, Mar. 2008, 1 page.

PCT International Search Report and Written Opinion in International Application No. PCT/US2019/046169, dated Oct. 18, 2019, 20 pages.

Seif, "Deep Learning for Image Recognition: why it's challenging, where we've been, and what's next", Jan. 2018, retrieved from the internet: URL <URL:https://towardsdatascience.com/deep-learning-for-image-classification-why-its-challenging-where-we-ve-been-and-what-s-next -93b56948fcef>, 1 page.

Takacs et al, "Outdoors augmented reality on mobile phone using loxel-based visual feature organization" Proceedings of the Workshop on Multimedia Information Retrieval, Oct. 2008, 1 page.

Upadhyay, "Knowledge Distillation—Neural Machine—Medium" Apr. 2018, Apr. 2018, retrieved from the Internet: URL <https://medium.com/neuralmachine/knowl edge-distillation-dc241d7c2322>, 1 page.

Wu et al, "Augmenting 3D urban environment using mobile devices" 10th IEEE International Symposium on IEEE, Oct. 2011, 1 page.

\* cited by examiner

ON-DEVICE IMAGE RECOGNITION

BACKGROUND

This specification relates to training machine learning models that can be used on a mobile device for image recognition. For example, a user may desire additional information related to content that a user is viewing on a mobile device. Such content may be either textual or an image. The user may desire to have an object or place of interest highlighted on the user device or some other feature that is indicative of information that may be useful to the user. For example, a user may encounter a restaurant and desire to know additional information about the restaurant.

A machine learning model can receive input and generate an output based on the received input and on values of the parameters of the model. For example, machine learning models may receive an image and generate a score for each of a set of classes, with the score for a given class representing a probability that the image contains an image of an object that belongs to the class.

The machine learning model may be composed of, e.g., a single level of linear or non-linear operations or may be a deep network, i.e., a machine learning model that is composed of a convolutional neural network. An example of a deep network is a neural network with one or more hidden layers. Neural networks are machine learning models that employ layers of nonlinear units to predict an output for a received input. Some neural networks are deep neural networks that include hidden layers in addition to an output layer. The output of each hidden layer is used as input to the next layer in the network. Each layer of the network generates an output from a received input in accordance with current values of a respective set of parameters.

SUMMARY

This specification describes technologies relating to systems and methods for image recognition on a mobile device. The subject matter provides an implementation of a recognition model which both allows for the limited processing and storage capabilities of mobiles devices, especially when compared to those of larger back-end computing apparatuses, and is efficient in terms of network usage.

In general, one innovative aspect of the subject matter described in this specification can be embodied in methods that include the actions of accessing a first model that has been trained to generate an output that classifies, according to a classification scheme, image data received as input, using the first model to train a second model to approximate the output of the first model to classify, according to the classification scheme, image data received as input, wherein the second model includes a plurality of connected layers including an output layer, an input layer, and a plurality of intermediate layers, and after the second model is trained, accessing map data that specifies a plurality of geographic locations, wherein each geographic location in at least a subset of the geographic locations is associated with an entity located at the geographic location and one or more images that depict the entity at the geographic location, for each geographic location associated with an entity for each image of the one or more images that depict the entity located at the geographic location, providing the image to the second model to generate an embedding for the image, wherein the embedding are data generated by one of the intermediate layers, associating each of the one or more embeddings generated by the second model with the geographic location, and storing, in a database, location data specifying the geographic location, the associated one or more embeddings, and data specifying the entity, as an associated entity entry for the entity. Other embodiments of this aspect include corresponding systems, apparatus, and computer programs, configured to perform the actions of the methods, encoded on computer storage devices.

These and other implementations can each optionally include one or more of the following features. In some aspects, the methods can further include receiving, from a mobile device, a request for entity entries in the database, the request including location data specifying a geographic location of the mobile device, and selecting a proper subset of the entity entries in the database based on the geographic location of the mobile device, wherein each entity entry in the proper subset of the entity entries has location data that is determined to meet a proximity threshold that indicates the geographic location of the entity is determined to be proximate to the geographic location of the mobile device.

In some aspects, the proximity threshold is a value that specifies a geographic distance. In some aspects, the proximity threshold is a value that specifies a pre-defined area that includes the geographic location of the mobile device.

In some aspects, the data specifying the entity includes an entity description describing the entity, and an entity name of the entity. In some aspects, the entity is a business entity. In some aspects, the entity is a landmark entity.

In some aspects, the second model is a convolutional neural network.

In general, one innovative aspect of the subject matter described in this specification can be embodied in methods implemented on a mobile device that include the actions of storing, on the mobile device, a first model that has been trained to approximate an output of a second model that classifies, according to a classification scheme, image data received as input, wherein the first model includes a plurality of connected layers including an output layer, an input layer, and a plurality of intermediate layers, sending, to a computer system that is external to the mobile device, a request for entity entries in a database managed by the computer system, the request including location data specifying a geographic location of the mobile device, wherein each entity entry includes location data specifying a geographic location, data specifying an entity located at the geographic location, one or more embeddings generated by the first model at the computer system, each of the one or more embeddings generated from one or more images received as input to the first model, and each of the images being an image that depicts the entity at the geographic location, and wherein each embedding are data generated by one of the intermediate layers, receiving, from the computer system, a proper subset of the entity entries in the database, the proper subset selected based on the geographic location of the mobile device, and storing the proper subset of the entity entries on the mobile device, capturing an image by the mobile device and providing the image as input to the first model to generate a captured image embedding, determining a set of matching embeddings in the proper subset of the entity entries, each matching embedding being an embedding that is determined to match the captured image embedding according to a match criterion, selecting, based on the set of matching embeddings, an entity entry in the proper subset of the entity entries as a matching entity entry, and providing, on a display device of the mobile device, display data describing the entity of the matching entity entry. Other embodiments of this aspect include corresponding systems, apparatus, and computer programs, configured to perform the actions of the methods, encoded on computer storage devices.

These and other implementations can each optionally include one or more of the following features. In some aspects, selecting, based on the set of matching embeddings, the entity entry in the proper subset of the entity entries as the matching entity entry includes for each entity entry having a matching embedding, determining a distance value based on the location data for the entity entry and the location data for the mobile device, and selecting the entity entry have a smallest distance value relative to the distance values of the other entity entries having a matching embedding.

In some aspects, providing display data describing the entity of the matching entity entry includes selecting a display location on the captured image, and displaying the display data on the captured image at the display location.

In some aspects, selecting a display location on the captured image includes determining, from the captured image embedding, an activation value that is a highest value relative to other active values in the captured image embedding, and selecting the display location that corresponds to the activation value in the captured image embedding.

In some aspects, the captured image is one of a plurality of image frames captured by the mobile device, and the determining the set of matching embeddings in the proper subset of the entity entries, the selecting the display location that corresponds to the activation value in the captured image embedding, and the displaying the display data on the captured image at the display location are done for the plurality of image frames.

In some aspects, the captured image is one of a plurality of image frames captured by the mobile device, and the determining the set of matching embeddings in the proper subset of the entity entries, the selecting an entity entry in the proper subset of the entity entries as a matching entity entry, and the providing the display data describing the entity of the matching entity entry, are done for the plurality of image frames.

In some aspects, the method can further include receiving, from the computer system, a further proper subset of the entity entries in the database, the further proper subset selected based on an updated geographic location of the mobile device, and storing the further proper subset of entity entries on the mobile device, capturing a further image by the mobile device and providing the further image as input to the first model to generate a further captured image embedding, determining a set of matching embeddings in the further proper subset of the entity entries, each matching embedding being an embedding that is determined to match the further captured image embedding according to a match criterion, selecting, based on the set of matching embeddings, an further entity entry in the further proper subset of the entity entries as a further matching entity entry, and providing, on the display device of the mobile device, display data describing the entity of the further matching entity entry.

In some aspects, the method can further include deleting, from the mobile device, the proper subset of the entity entries when the mobile device is determined to be in the updated geographic location.

Particular embodiments of the subject matter described in this specification can be implemented so as to realize one or more of the following advantages. The subject matter provides an implementation of a robust image recognition machine learning model which both allows for the limited processing and storage capabilities of mobiles devices, especially when compared to those of larger back-end computing apparatuses.

Further, the subject matter provides an implementation that is efficient in terms of network usage because the trained machine learning model is deployed on the mobile device using a subset of an embedding database that can be downloaded to the mobile device at one time. This implementation allows a user to use an image recognition application without having to access a server over the network for each image as long as the user is within a location area associated with the subset of the embedding database. Thus, by using a subset of an embedding database based on the mobile device's location, such as a city or a defined geographic portion of an area (e.g., a predefined cell of X×Y meters, or the like), the system reduces the number of processing cycles and having to download additional data from a server. This reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

Additionally, a trained student model is easier to deploy on a mobile device than a teacher model because it requires less computation, memory, or both, to generate outputs at run time than the teacher machine learning model. Once trained using the teacher model, the student model can generate outputs that are not significantly less accurate than outputs generated by the teacher machine learning model despite being easier to deploy or using fewer computational resources than the teacher machine learning model.

In some implementations, the system can receive image data (single image, continuous video, etc.) and user input of a request to identify an item of interest in the image data on a mobile device, determine whether there are objects of interest within the image data, and generate display data to display those objects of interest on a user device. The display data may include any type of visual or audible feedback to signal to the user that an object of interest is in the image data. Additionally, the system can provide additional information to the user related to the identified object.

In some implementations, the system allows more frames to be processed on the mobile device to reduce bandwidth and server resources utilized during the image recognition process. Performing the image recognition at the mobile device may also lead to to higher accuracy since there are more attempts at recognizing an object from different viewpoints.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
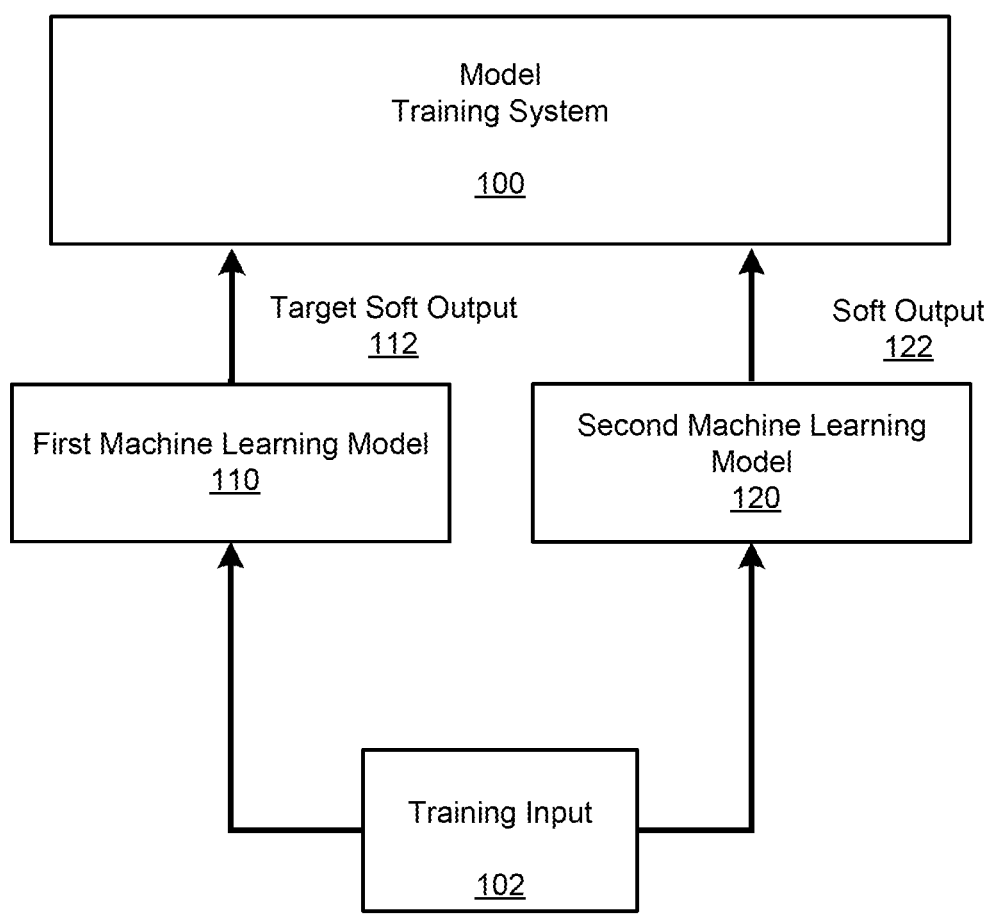
FIG. 1 is an example machine learning model training system.

Systems, methods, and computer program products are described for on-device image recognition for mobile devices. Example mobile devices include personal computers, mobile communication devices, and other devices that can send and receive data over a network. The subject matter addresses the technical challenges of providing and implementing a robust image recognition model on a mobile device for images captured by the mobile device, where the image recognition model takes into account the geographic location of the user device as part of the image recognition process. The recognition model allows for the limited processing and storage capabilities of mobiles devices, especially when compared to those of larger back-end computing apparatuses, and is efficient in terms of network usage. As explained below, the subject matter may involve providing a proper subset of a large image embedding database to a mobile device based on the mobile device's location. This may involve providing a subset of an embedding database based on comparing a geographic location of the mobile device to the geographic locations stored in the database, and providing only the entries of the database that meet a proximity threshold. The subject matter may also involve distillation, or any other machine learning process that generates a compressed model that mimics or approximates the output of a larger model, so that the compressed model may be stored and implemented on the mobile device without undesirable processing impacts due to the limited capabilities of the mobile device.

To generate the on-device model, the system accesses a first model that has been trained to generate an output that accurately classifies, according to a classification scheme, image data received as input. Using the first model, the system trains a second model (the "on-device model") to approximate the output of the first model to classify, according to the classification scheme, image data received as input. The second model includes a plurality of connected layers including an output layer, an input layer, and a plurality of intermediate layers. The second model may have fewer layers, less convolutional filters, or fewer nodes per layer than the first model, and occupy a smaller space in computer memory. As explained further below, the image data received as input to the second model may include data from images captured by a camera of a device on which the second model is stored, so that the device may perform one or more inference steps using the second model to accurately recognize aspects of the images without needing to send the image data over a data network for recognition by a back-end computing system.

After the second model is trained, the system accesses map data that specifies a plurality of geographic locations. Each geographic location in at least a subset of the geographic locations is associated with an entity located at the geographic location, and one or more images that depict the entity at the geographic location. The entity may be a store, a building, a landmark, or any other identifiable physical, real-world entity.

For each geographic location associated with an entity, the system, for each image that depicts the entity located at the geographic location, provides the image to the second model to generate an embedding for the image. The embeddings are data generated by one of the intermediate layers. The system then associates each of the embeddings generated by the second model with the geographic location, and stores, in a database, location data specifying the geographic location, the associated one or more embeddings, and data specifying the entity, as an associated entity entry for the entity.

The second model is then provided to mobile devices. The mobile devices may then use the second model to identify entities in a lightweight but robust manner. More particularly, the system may receive, from a mobile device, a request for entity entries in the database. The request may include location data specifying a geographic location of the mobile device. The system selects a proper subset of the entity entries in the database based on the geographic location of the mobile device. Each entity entry in the proper subset of entity entries has location data that is determined to meet a proximity threshold that indicates the geographic location of the entity is determined to be proximate to the geographic location of the mobile device.

The mobile device receives and stores the proper subset of the entity entries in the database, for example in cache memory. The mobile devices captures an image, e.g., the user takes a picture of a store front, and provides the image as input to the second model to generate a captured image embedding. The mobile device then determines a set of matching embeddings in the proper subset of the entity entries. Each matching embedding is an embedding that is determined to match the captured image embedding according to a match criterion. The mobile devices selects, based on the set of matching embeddings, an entity entry in the proper subset of the entity entries as an matching entity entry, and then provides, on a display device of the mobile device, display data describing the entity of the matching entity entry.

When two or more entity entries have matching embeddings, such as in the case of two different stores for which entity data are stored at the mobile device, the mobile device may select a closest entity entry for display. For example, for each entity entry having a matching embedding, the mobile device may determine a distance value based on the location data for the entity entry and the location data for the mobile device. The mobile device then selects the entity entry having a smallest distance value relative to the distance values of the other entity entries having a matching embedding.

These features and additional features are described in more detail below.

FIG. 1 is a block diagram of an example machine learning model training system 100. The machine learning model training system 100 is an example of a system implemented as computer programs on one or more computers in one or more locations, in which the systems, components, and techniques described below are implemented.

The machine learning model training system 100 trains a second machine learning model 120 using a trained first machine learning model 110. Generally, a machine learning model receives input and generates an output based on the received input and on values of the parameters of the model. According to some implementations, one way of creating a trained second model is by distillation. According to some implementations, other machine learning processes for using a neural network to generate a second model can be used.

In particular, both the second machine learning model 120 and the trained first machine learning model 110 are machine learning models that have been configured to receive an input and to process the received input to generate a respective score for each class in a predetermined set of classes. Both the first machine learning model 110 and the second machine learning model 120 include a plurality of connected layers. The connected layers include an output layer, an input layer, and a plurality of intermediate layers. Generally, the second machine learning model 120 is a model that has a different architecture from the first machine learning model 110 that makes it easier to deploy than the first machine learning model 110, e.g., because the second machine learning model 120 requires less computation, memory, or both, to generate outputs at run time than the first machine learning model 110. For example, the second machine learning model 120 may have fewer layers, fewer parameters, or both than the first machine learning model 110.

The trained first machine learning model 110 has been trained on a set of training inputs using a conventional machine learning training technique to determine trained values of the parameters of the first machine learning model 110. In particular, the trained first machine learning model 110 has been trained so that the score generated by the trained first machine learning model 110 for a given class for a given input represents the probability that the class is an accurate classification of the input.

For example, if the inputs to the first machine learning model 110 are images, the score for a given class may represent a probability that the input image contains an image of an object that belongs to the class. In a particular example, the first machine learning model 110 can determine whether an image depicts an object that is classified in one or more of the following classes: building (e.g., restaurant, business, etc.), text, barcode, landmark, media object (e.g., album cover, movie poster, etc.), or artwork object (e.g., painting, sculpture, etc.). As another example, if the inputs to the first machine learning model 110 are text segments, the classes may be topics, and the score for a given topic may represent a probability that the input text segment relates to the topic.

According to some implementations, the first machine learning model 110 is a single machine learning model. In some other cases, the first machine learning model 110 is an ensemble machine learning model that is a compilation of multiple individual machine learning models that have been trained separately, with the outputs of the individual machine learning models being combined to generate the output of the first machine learning model 110. Further, in some cases, the models in the ensemble machine learning model include one or more full models that generate scores for each of the classes and one or more specialist models that generate scores for only a respective subset of the classes.

The model training system 100 trains the second machine learning model 120 on a set of training inputs in order to determine trained values of the parameters of the second machine learning model 120 so that the score generated by the second machine learning model 120 for a given class for a given input also represents the probability that the class is an accurate classification of the input.

In particular, to train the second machine learning model 120, the model training system 100 configures both the second machine learning model 120 and the first machine learning model 110 to, during training of the second machine learning model 120, generate soft outputs from training inputs.

A soft output of a machine learning model for a given input includes a respective soft score for each of the classes that is generated by the last layer of the machine learning model. The soft scores define a softer score distribution over the set of classes for the input than the original training data.

During the training, the model training system 100 processes training input 102 using the first machine learning model 110 to generate a target soft output 112 for the training input 102. The model training system 100 also processes the training input 102 using the second machine learning model 120 to generate a soft output 122 for the training input 102. The model training system 100 then trains the second machine learning model 120 to generate soft outputs 122 that match the target soft outputs 112 for the training inputs 102 by adjusting the values of the parameters of the second machine learning model 120.

The model training system illustrated in FIG. 1 is but one example model training system 100 for training a distilled machine learning model. Other machine learning processes can be used to train the second model. In some implementations, image recognition may be performed by using multiple types of models or signals. For example, using both embeddings and optical character recognition (OCR).

The trained second machine learning model 120 is then used to generate an entity database from a map database. This generation of this data is described in more detail below with reference to FIG. 2, which is a block diagram of an example environment 200 in which a process generates a database of embeddings from map data using the second machine learning model. The example environment 200 includes a map database 210, the trained second machine learning model 120 of FIG. 1, a database generator 220, and an entity database 230.

The map database 210 is a data store that includes geographic location data, entity data, and image data. The geographic location data can be GPS coordinates, map coordinates (e.g., latitude and longitude), or any other location information the system can recognize. The entity data can include the name of the entity and other metadata (e.g., a review score, a type of place, menus, etc.). The image data can be one or more single frame images, continuous video, a stream of images, or the like, from a camera of a mobile device. The image data, also referred to as reference images, may be taken by several users and raters (e.g., social media raters of restaurants). Additionally, the image data may be extracted from a street view database that provides panoramic views from positions along many streets in the world.

According to some aspects, the map data specifies a plurality of geographic locations, where each geographic location in at least a subset of the geographic locations is associated with an entity located at the geographic location and one or more images that depict the entity at the geographic location. For example, an entity may be a store, a building, a landmark, or any other identifiable physical, real-world entity, and the map data specifies a location in an image for a respective identified entity. According to some aspects, several images in the map data may be associated with one respective entity.

The map database 210 is accessed by the second machine learning model 120, and the second model 120 accesses images in the database 210 to generate image embeddings 215 for each accessed image. The image embeddings 215 are data generated by one of the intermediate layers of the second machine learning model 120, e.g., the last layer prior to the output layer. Of course, different intermediate layers may also be used for the embeddings. A database generator 220 can then create an entity database 230 from the generated image embeddings 215.

The entity database 230 is a data store that can includes the geographic location data and entity data of the map database 210, and the image embeddings 215 that were generated by the second model 120. According to some aspects, the location data, entity data, and image embeddings 215 are associated with a respective entity. According to some aspects, several image embeddings 215 may be associated with one respective entity. For example, if a particular entity—a particular coffee shop at a particular location—has a dozen storefront images of the coffee shop at the location stored in the map database, then a respective embedding may be created for each storefront image. In some implementations, an average embedding may be used when there are several image embeddings 215 associated with one respective entity (e.g., recognizing a chain-level restaurant which tend to share similar features).

Once the entity database 230 is created, it can be provided to a mobile device, along with the second model. Due to the size of the database 230, however, only a portion, i.e., a proper subset of the database 230 is provide to the mobile device. The particular portion that is provided depends on the location of the mobile device. Accessing and using a subset of the entity database 230 by a mobile device is described in more detail below with reference to FIG. 3.

Figure 3:
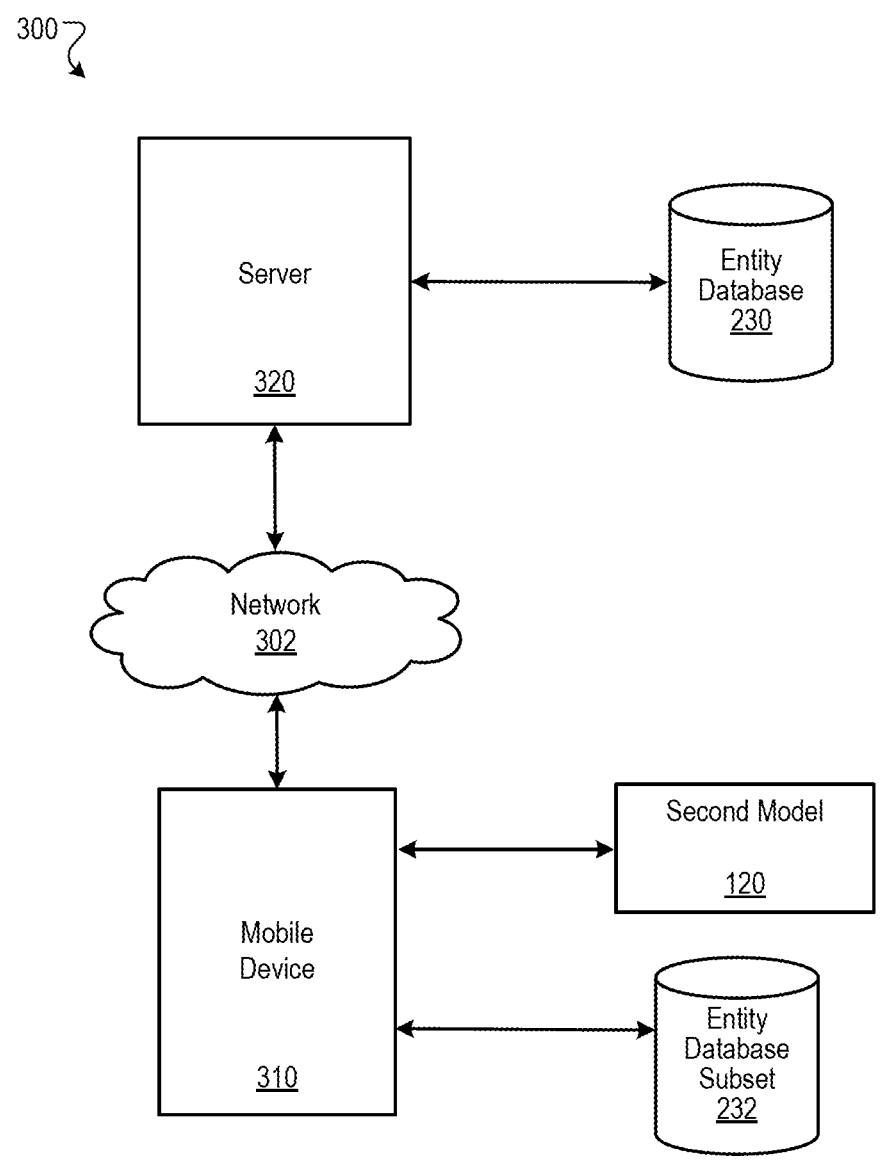
FIG. 3 is a block diagram of an example environment in which an image recognition process may occur on a mobile device using an image embedding database subset.

FIG. 3 is a block diagram of an example environment 300 in which an image recognition process may occur on a mobile device using an image embedding database subset. A computer network 302, such as a local area network (LAN), wide area network (WAN), the Internet, or a combination thereof, connects server 320 and mobile device 310.

The server 320 may represent a combination of application servers, database servers, communication servers, web servers, and the like that include the systems of a mobile platform provider used to collect data from, control, and manage the applications and modules used on various mobile devices 310 described herein. The server 320 has access to the entity database 230 in order to provide the mobile device a subset of the entity entries in the database based on the geographic location of the mobile device.

The mobile device 310 can present media using an application. Media are images, video, audio, text, or some combination of the like that a user consumes using an application running on a mobile device 310. The web browser can enable a user to display and interact with text, images, videos, music and other information typically located on a web page at a website on the World Wide Web or a local area network.

The mobile device 310 can include a trained on device machine learning model, such as the second machine learning model 120. The mobile device 310 can also run a variety of applications. An application on a mobile device 310 can include an application environment, e.g., a graphical user interface (GUI), in which images may be shown. Examples of such applications are camera-enable applications that can use an on-device camera to capture an image, applications that can receive images from publishers over the network 302 and display the images, and applications that can access and display images that are stored on the mobile device 310. For example, an application may have access to a repository of image data stored on the mobile device 310, where the application environment can load an image from the image data. Further, an application can facilitate the use of the second machine learning model 120.

According to some implementations, the mobile device 310 requests a subset of entity entries from the server 320. The mobile device 310 can receive and store the subset of the entity entries in the entity database subset 232, for example in on-device memory.

According to some implementations, the mobile device 310 captures an image, e.g., the user takes a picture of a store front, and provides the image as input to the second model 120 to generate a captured image embedding. The mobile device 310 can determine a set of matching embeddings in the subset of the entity entries. Each matching embedding is an embedding that is determined to match the captured image embedding according to a match criterion. The mobile devices selects, based on the set of matching embeddings, an entity entry in the subset of the entity entries as an matching entity entry, and then provides, on a display device of the mobile device 310, display data describing the entity of the matching entity entry. An example of the display data on a display device of the mobile device 310 is described in more detail below with reference to FIG. 4.

Figure 4:
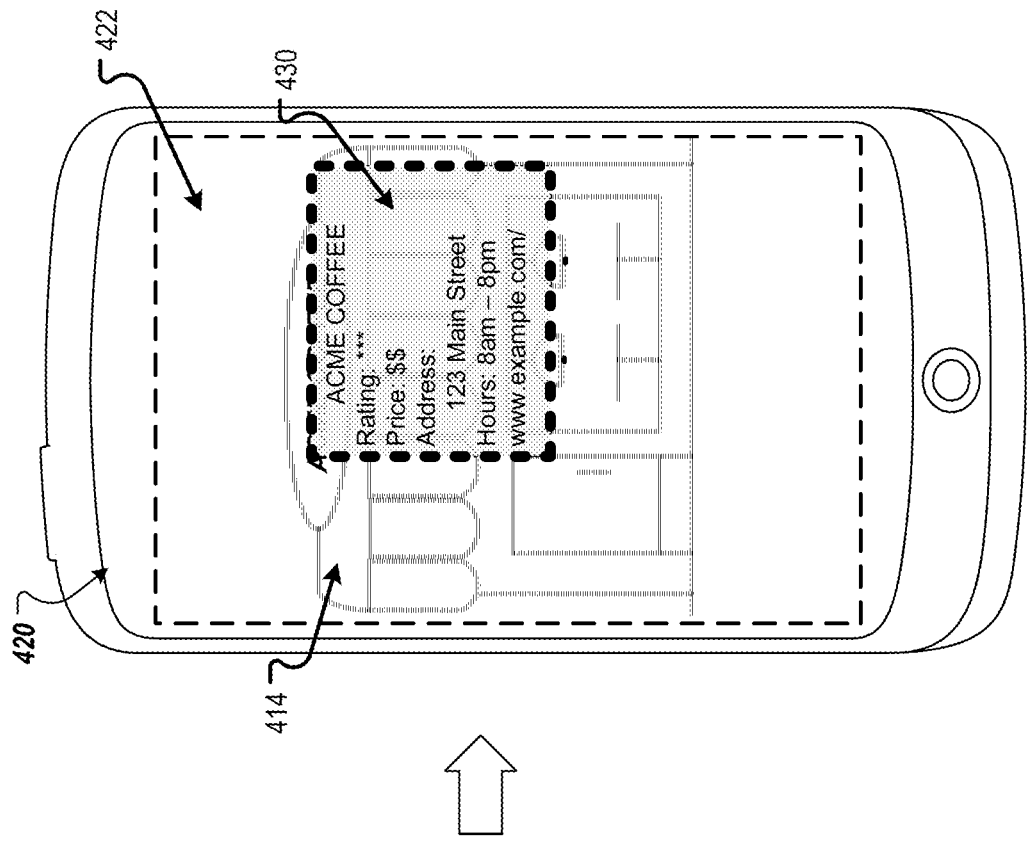
FIG. 4 is a sequence of example screen shots of a mobile device that present display data describing an entity of a matching entity entry.
Figure 4:
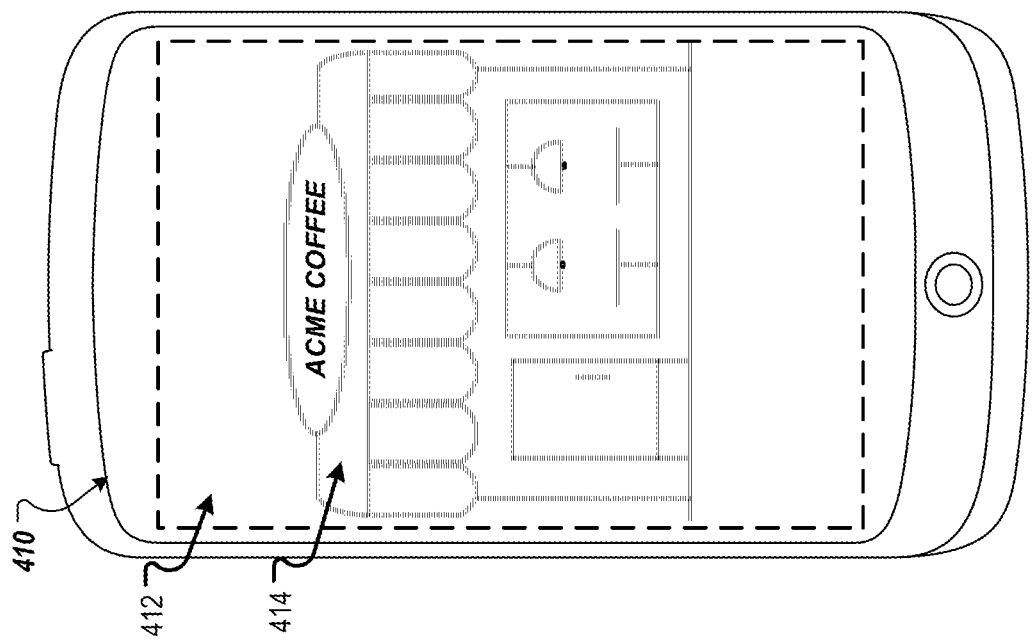

FIG. 4 depicts a sequence of example screen shots 410 and 420 of a mobile device that presents display data describing an entity of a matching entity entry. The first screen shot 410 depicts an example user interface 412 of a mobile device, such as mobile device 310. In this example, a user is viewing an entity 414, a coffee shop, through a viewfinder of a camera that is presented in the user interface 412. The user interface 412 can be generated and presented by an application on the mobile device.

The second screen shot 420 presents an example user interface 422 with display data 430 describing the identified entity 414. In this example, the user interface 422 presents display data 430 as a graphic overlay on the current view of the user interface 422. In particular, the display data 430 presents a graphic overlay over a portion of the identified entity 414, which, in this example, is a coffee shop named: "ACME COFFEE". The user is presented with information related to the identified entity 414 in the display data 430. The display data 430 can include, for example, but not limited to, the identified name of the entity 414, a social rating from other users (if applicable), average price for items sold at the entity 414, the address, hours of operation, a website link, or any other information related to the entity.

The mobile device 310 can identify the entity 414 based on the geographic location of the mobile device 310 by matching embeddings from the subset of entity entries, such as entity database 230, and embeddings from a captured image of the entity 414. The identification process is implementing the second model 120 on the mobile device 310 using processes described above and in more detail below with reference to FIGS. 5 and 6.

Figure 5:
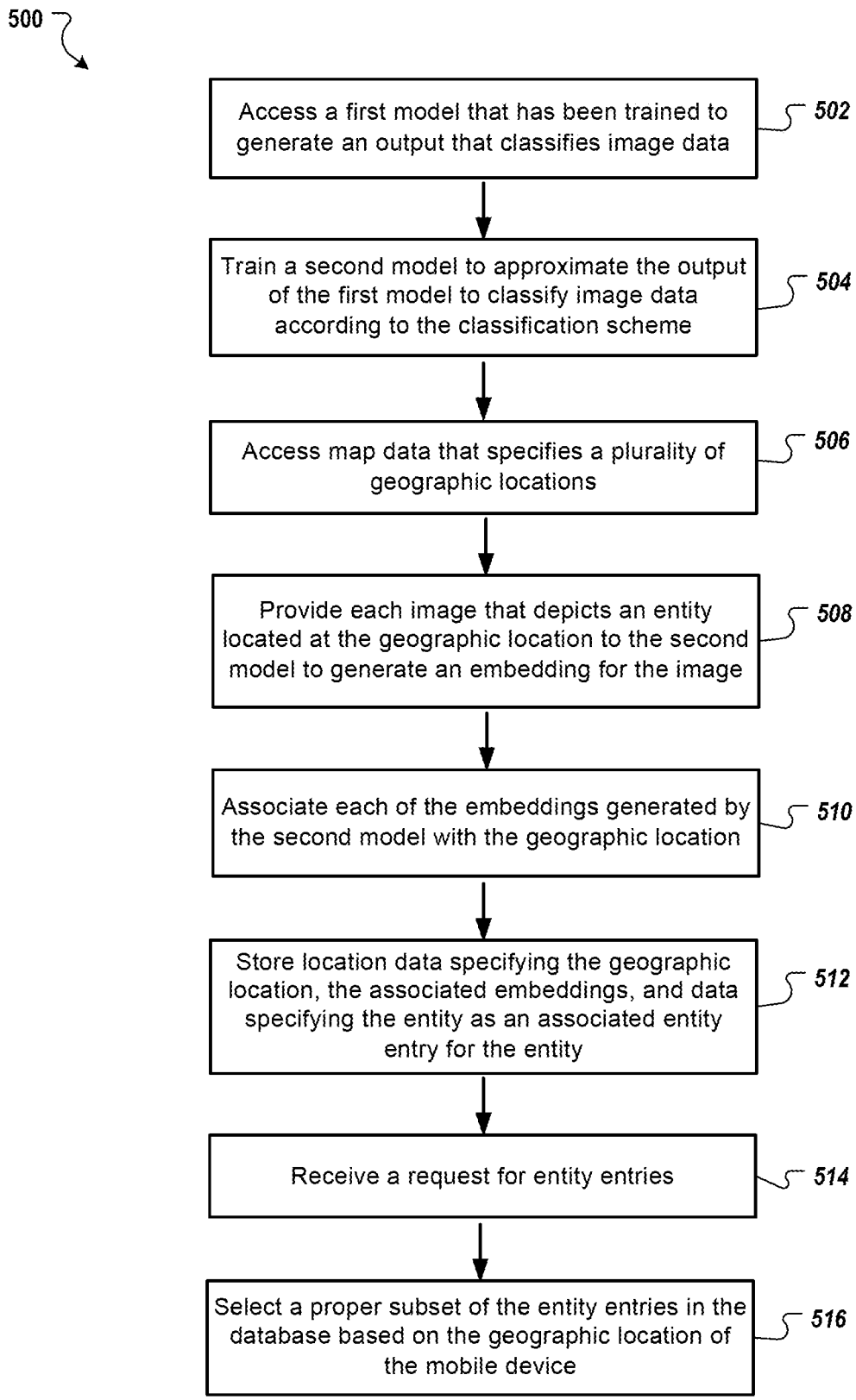
FIG. 5 is a flow diagram of an example process for training and using machine learning models for image recognition.

FIG. 5 is a flow diagram of an example process 500 for training and using machine learning models for image recognition.

The process 500 accesses a first model that has been trained to generate an output that classifies image data received as input (502). The image data can be classified according to a classification scheme. For example, as shown in FIG. 1, the first machine learning model 110 can be trained to score for a given class may represent a probability that the input image contains an image of an object that belongs to the class. In a particular example, the first machine learning model 110 can determine whether an image depicts an object that is classified in one or more of the following classes: building (e.g., restaurant, business, etc.), text, barcode, landmark, media object (e.g., album cover, movie poster, etc.), or artwork object (e.g., painting, sculpture, etc.). Additionally, any number of different classes or subsets of classes may be used for the classification scheme.

The process 500 trains a second model to approximate the output of the first model to classify image data received as input according to the classification scheme (504). For example, as shown in FIG. 1, the second machine learning model 120 can be trained to approximate the target soft output 112 of the first machine learning model 110 as soft output 122. According to some implementations, the second model is a convolutional neural network.

Figure 2:
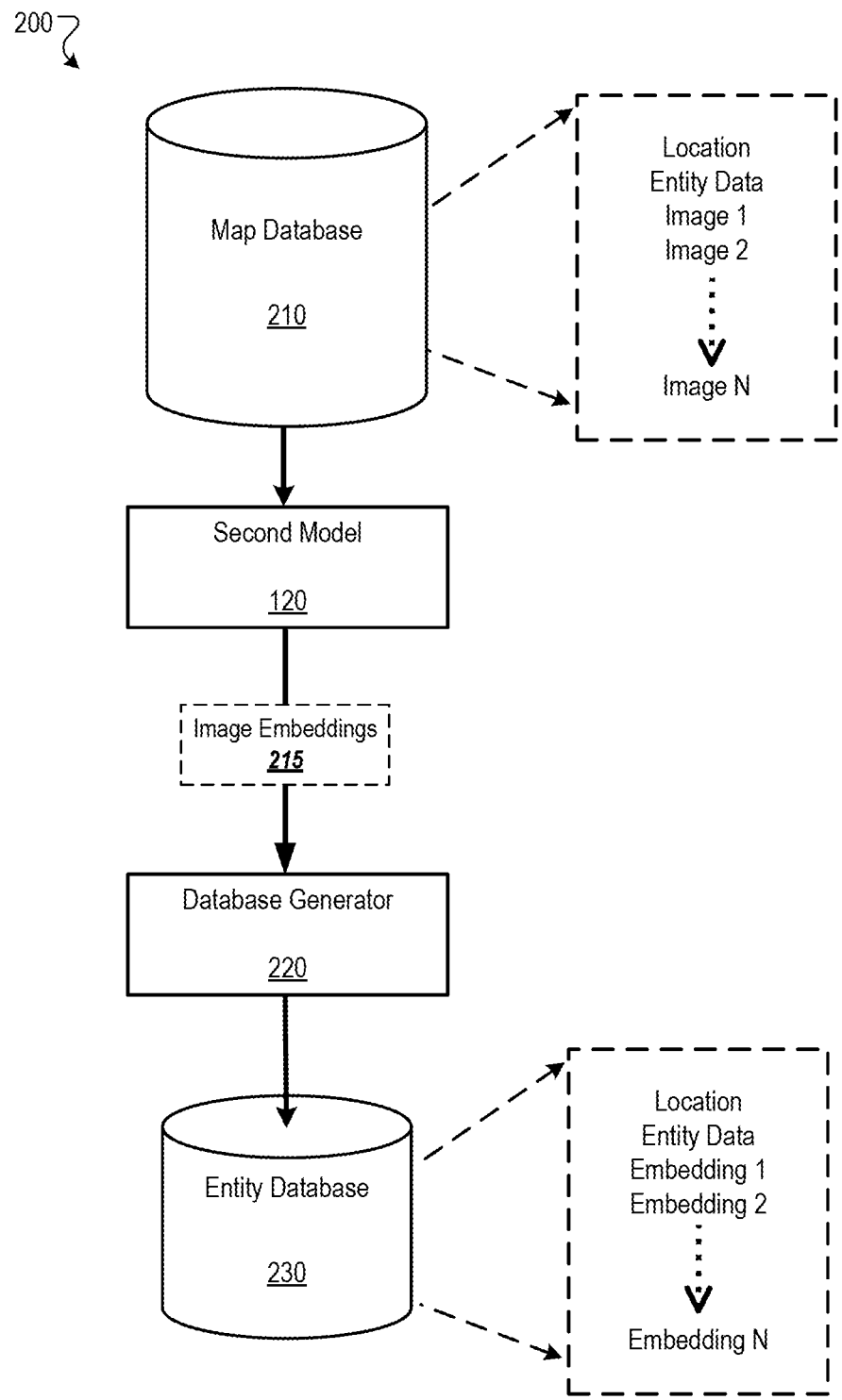
FIG. 2 is a block diagram of an example environment in which a process may occur to generate an entity database of embeddings from map data using a trained machine learning model.

After the second model is trained, the process 500 accesses map data that specifies a plurality of geographic locations (506). In some implementations, each geographic location in at least a subset of the geographic locations is associated with an entity located at the geographic location and one or more images that depict the entity at the geographic location. For example, as shown in FIG. 2, the second machine learning model 120 accesses map data from the map database 210.

For each geographic location associated with an entity, the process 500 provides each image that depicts an entity located at the geographic location to the second model to generate an embedding for the image (508). According to some implementations, the embedding are data generated by one of the intermediate layers of the second model. For example, as shown in FIG. 2, the second machine learning model 120 will generate image embeddings 215 for each image of the one or more images that depict the entity located at the geographic location from the map data of the map database 210.

For each geographic location associated with an entity, the process 500 associates each of the embeddings generated by the second model with the geographic location (510). For example, as shown in FIG. 2, the database generator 220 receives the image embeddings 215 generated from the second machine learning model 120, and the location data and entity data from the map database 210 to generate the entity database 230.

For each geographic location associated with an entity, the process 500 stores location data specifying the geographic location, the associated embeddings, and data specifying the entity as an associated entity entry for the entity (512). For example, as shown in FIG. 2, the entity database 230 receives the image embeddings 215 generated from the second machine learning model 120, and the location data and entity data from the map database 210, and stores the respective data for each geographic location associated with an entity.

According to some implementations, the data specifying the entity includes an entity description describing the entity, and an entity name of the entity. For example, as shown in FIG. 4, the display data 430 describes the entity 414, including the name of entity 414. According to some implementations, the entity is a business entity, such as entity 414. According to some implementations, the entity is a landmark entity. For example, the captured image of the mobile device may be of a statue in a city that a user of the mobile device is not familiar with or the user may want additional information regarding the statue. Thus, the data specifying the entity may specify the name of the statue, and additional information regarding the statue.

After the second model is trained and the second model has generated embeddings for each image of the one or more images that depict the entity located at the geographic location, the process 500 receives a request for entity entries (514). According to some implementations, the request includes location data specifying a geographic location of a mobile device. For example, as shown in FIG. 3, a mobile device 310 sends a request to server 320 for a subset of the entity entries in the entity database 230. The request includes the geographic location of the mobile device.

The process 500 selects a proper subset of the entity entries in the database based on the geographic location of the mobile device (516). According to some implementations, each entity entry in the subset of the entity entries has location data that is determined to meet a proximity threshold that indicates the geographic location of the entity is determined to be proximate to the geographic location of the mobile device. For example, the location information from the mobile device (e.g., GPS) is located in a particular city, such that the server 320 may provide a subset of the entity database for that particular city to limit the size of the data needed by the mobile device.

In some implementations, predefined cell data may be used to further limit the size of the subset of the entity entries. For example, some cities may contain thousands and thousands of identifiable entities where the size of the data for the subset requested maybe too large or cumbersome for the mobile device to download. The data are thus divided in to predefined cell areas. In some implementations, the cells are a mathematical mechanism that helps computers translate Earth's spherical 3D shape into 2D geometry and can assist in dividing a large area, such as a large city, into several organized cells. In some implementations, other known ways of dividing up a geographical location area may be used.

According to some implementations, the proximity threshold is a value that specifies a geographic distance. According to some implementations, the proximity threshold is a value that specifies a pre-defined area that includes the geographic location of the mobile device. For example, the proximity threshold could be a distance determined by a radial distance outward from the location of the phone, creating a circumference of location data with respect to the location of the mobile device. When the user or an application on the mobile device requests a new subset of entity entries, the subset of data could be embedding data for a circular area surrounding the location of the mobile device.

Figure 6:
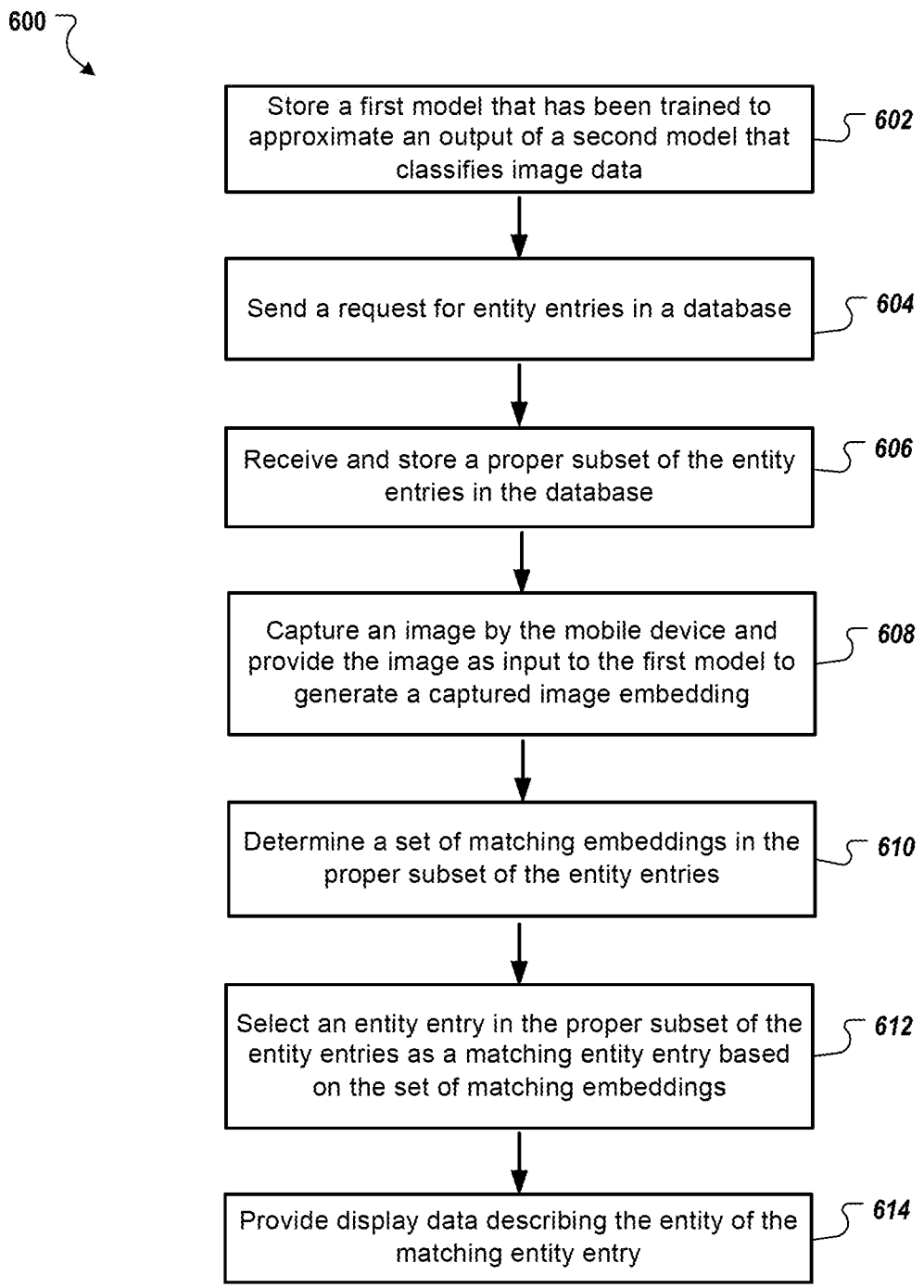
FIG. 6 is a flow diagram of an example process for using a machine learning model for an image recognition process on a mobile device.

FIG. 6 is a flow diagram of an example process 600 for using a machine learning model for an image recognition process on a mobile device.

The process 600 stores, on the mobile device, a first model that has been trained to approximate an output of a second model that classifies image data received as input (602). The image data can be classified according to a classification scheme. For example, as shown in FIG. 1, the second machine learning model 120 can be trained to approximate the output of the first machine learning model 110, where the first machine learning model 110 can be trained to score for a given class may represent a probability that the input image contains an image of an object that belongs to the class. Note that the first model of process 600 refers to the student model, e.g., the second machine learning model 120 of FIG. 1, and the second model of process 600 refers to the teaching model, e.g., the first machine learning model 110 of FIG. 1.

The process 600 sends a request to a computer system that is external to the mobile device for entity entries in a database managed by the computer system (604). According to some implementations, the request includes location data specifying a geographic location of a mobile device. For example, as shown in FIG. 3, mobile device 310 sends a request to server 320 for a subset of the entity entries in the entity database 230 based on the geographic location of the mobile device.

According to some implementations, each entity entry includes location data specifying a geographic location, data specifying an entity located at the geographic location, and one or more embeddings generated by the first model at the computer system. Additionally, each of the one or more embeddings are generated from one or more images received as input to the first model, and each of the images is an image that depicts the entity at the geographic location. According to some implementations, each embedding are data generated by one of the intermediate layers of the first model (i.e., the second machine learning model 120).

The process 600 receives a proper subset of the entity entries in the database based on the geographic location of the mobile device from the computer system and stores the proper subset on the mobile device (606). For example, as shown in FIG. 3, a mobile device 310 can store the proper subset of the entity entries in the entity database subset 232 in the mobile device.

The process 600 captures an image by the mobile device and provides the image as input to the first model to generate a captured image embedding (608). For example, as shown in FIG. 4, the screen shot 410 depicts an image in the user interface 412 of a mobile device. This image is then provided to the model stored on the mobile device, such as the second machine learning model 120, to generate a captured image embedding.

The process 600 determines a set of matching embeddings in the proper subset of the entity entries (610). According to some implementations, each matching embedding is an embedding that is determined to match the captured image embedding according to a match criterion. For example, as shown in FIG. 3, the mobile device 310, can determine if the captured image embedding generated by the model matches an embedding that is stored in the entity database subset 232 on the mobile device.

The process 600 selects an entity entry in the proper subset of the entity entries as a matching entity entry based on the set of matching embeddings (612). For example, as shown in FIG. 3, the mobile device 310, will select an entity entry if there is a determination of a match between the captured image embedding generated by the model and the embeddings stored in the entity database subset 232 on the mobile device.

According to some implementations, selecting the entity entry in the proper subset of the entity entries as the matching entity entry includes determining a distance value based on the location data for the entity entry and the location data for the mobile device for each entity entry having a matching embedding. In some aspects, selecting the entity entry includes selecting an entity entry having a smallest distance value relative to the distance values of the other entity entries having a matching embedding. For example, when two or more entity entries have matching embeddings, such as in the case of two different stores for which entity data are stored at the mobile device, the mobile device may select a closest entity entry for display. The mobile device then selects the entity entry have a smallest distance value relative to the distance values of the other entity entries having a matching embedding.

The process 600 provides display data describing the entity of the matching entity entry (614). According to some implementations, providing display data describing the entity of the matching entity entry includes selecting a display location on the captured image, and displaying the display data on the captured image at the display location. For example, as shown in FIG. 4, the second screen shot 420 presents an example user interface 422 with display data 430 describing the identified entity 414. In this example, the user interface 422 presents display data 430 as a graphic overlay on the current view of the user interface 422. In particular, the display data 430 presents a graphic overlay over a portion of the identified entity 414, which, in this example, is a coffee shop: "ACME COFFEE".

According to some implementations, selecting a display location on the captured image includes determining, from the captured image embedding, an activation value that is a highest value relative to other active values in the captured image embedding, and selecting the display location that corresponds to the activation value in the captured image embedding.

According to some implementations, the captured image is one of a plurality of image frames captured by the mobile device, such that the determining the set of matching embeddings in the proper subset of the entity entries, the selecting the display location that corresponds to the activation value in the captured image embedding, and the displaying the display data on the captured image at the display location are done for the plurality of image frames.

According to some implementations, the process 600 may further include receiving another proper subset of the entity entries in the database based on an updated geographic location of the mobile device. For example, the mobile device geographic location moved to a different location, such as a different city, or outside of the geographical area the first proper subset covered. Additionally, the process may include capturing a further image, determining a set of matching embeddings that is determined to match the further captured image embedding according to a match criterion, selecting a further entity entry in the further proper subset of the entity entries as a further matching entity entry, and providing display data describing the entity of the further matching entity entry.

According to some implementations, after processing a further, or updated, proper subset of the entity entries based on an updated geographic location, the process 600 can further include deleting, from the mobile device, the proper subset of the entity entries when the mobile device is determined to be in the updated geographic location. For example, the mobile device may only store the data for the current geographic location of the mobile device. This feature can help reduce storage capacity needs on the mobile device. Furthermore, by removing the first proper subset of the entity entries, if a user returns to that geographic location and needs to download that first proper subset of the entity entries again, updated embeddings may be included when the mobile device downloads the proper subset of the entity entries.

According to some implementations, the processes of transferring or training of machine learning models, accessing a subset of data (e.g., a subset of geographic locations of map data), and using the subset of data to identify and store the data in a subset database may be processed individually, together as one process as described herein (e.g., process 600), or in any combination. According to some implementations, other signals or data may be used other than geographic location to identify a subset database similar to a subset signal such as geographic location as described herein.

Figure 7:
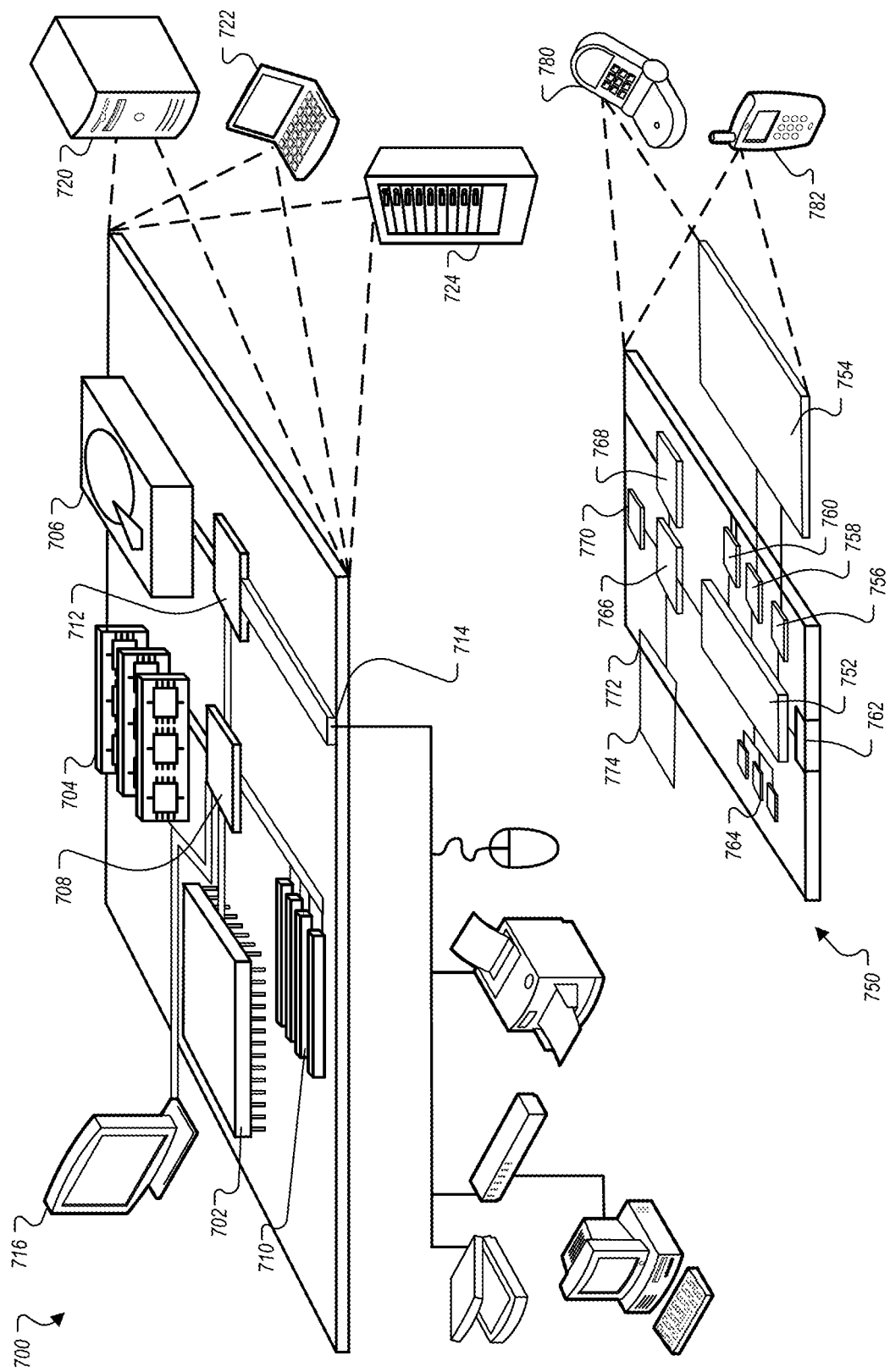
FIG. 7 is a block diagram of an example computing devices that can be used to implement the methods, systems and processes described in this disclosure.

FIG. 7 is a block diagram of example computing devices 700, 750 that can be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 700 is further intended to represent any other typically non-mobile devices, such as televisions or other electronic devices with one or more processers embedded therein or attached thereto. Computing device 750 is intended to represent various forms of mobile devices, such as personal digital assistants, cellular telephones, smartphones, and other computing devices. The components shown here, their connections and relationships, and their functions, are meant to be examples only, and are not meant to limit implementations of the disclosures described and/or claimed in this document.

Computing device 700 includes a processor 702, memory 704, a storage device 706, a high-speed controller 708 connecting to memory 704 and high-speed expansion ports 710, and a low-speed controller 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a graphical user interface (GUI) on an external input/output device, such as display 716 coupled to high-speed controller 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of duties is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed bus 714. The low-speed bus 714 (e.g., a low speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as computing device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The computing device 750 may also be provided with a storage device, such as a micro-drive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the computing device 750, such as control of user interfaces, applications run by computing device 750, and wireless communication by computing device 750.

Processor 752 may communicate with a user through control interface 758 and display interface 756 coupled to a display 754. The display 754 may be, for example, a TFT LCD display or an OLED display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of computing device 750 with other devices. External interface 762 may provide, for example, for wired communication (e.g., via a docking procedure) or for wireless communication (e.g., via Bluetooth® or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to computing device 750 through expansion interface 772, which may include, for example, a subscriber identification module (SIM) card interface. Such expansion memory 774 may provide extra storage space for computing device 750, or may also store applications or other information for computing device 750. Specifically, expansion memory 774 may include instructions to carry out or supplement the processes described above, and may include secure information also. Thus, for example, expansion memory 774 may be provide as a security module for computing device 750, and may be programmed with instructions that permit secure use of computing device 750. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Computing device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 768 (e.g., a radio-frequency transceiver). In addition, short-range communication may occur, such as using a Bluetooth®, WiFi, or other such transceiver (not shown). In addition, GPS receiver module 770 may provide additional wireless data to computing device 750, which may be used as appropriate by applications running on computing device 750.

Computing device 750 may also communicate audibly using audio codec 760, which may receive spoken information from a user and convert it to usable digital information. Audio codec 760 may likewise generate audible sound for a user, such as through a speaker, e.g., in a handset of computing device 750. Such sound may include sound from voice telephone calls, may include recorded sound (e.g., voice messages, music files, etc.) and may also include sound generated by applications operating on computing device 750.

The computing device 750 may be implemented in a number of different forms, as shown in the figure. For example, it may be implemented as a cellular telephone 780. It may also be implemented as part of a smartphone 782, personal digital assistant, or other mobile device.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, comprising:
   accessing a first model that has been trained to generate an output that classifies, according to a classification scheme, image data received as input;
   using the first model to train a second model to approximate the output of the first model to classify, according to the classification scheme, image data received as input, wherein the second model includes a plurality of connected layers including an output layer, an input layer, and a plurality of intermediate layers; and after the second model is trained:
accessing map data that specifies a plurality of geographic locations, wherein each geographic location in at least a subset of the geographic locations is associated with an entity located at the geographic location and one or more images that depict the entity at the geographic location;
for each geographic location associated with an entity:
for each image of the one or more images that depict the entity located at the geographic location, providing the image to the second model to generate an embedding for the image, wherein the embedding are data generated by one of the intermediate layers;
associating each of the one or more embeddings generated by the second model with the geographic location; and
storing, in a database, location data specifying the geographic location, the associated one or more embeddings, and data specifying the entity, as an associated entity entry for the entity.

2. The method of claim 1, further comprising:
receiving, from a mobile device, a request for entity entries in the database, the request including location data specifying a geographic location of the mobile device; and
selecting a proper subset of the entity entries in the database based on the geographic location of the mobile device, wherein each entity entry in the proper subset of the entity entries has location data that is determined to meet a proximity threshold that indicates the geographic location of the entity is determined to be proximate to the geographic location of the mobile device.

3. The method of claim 2, wherein the proximity threshold is a value that specifies a geographic distance.

4. The method of claim 2, wherein the proximity threshold is a value that specifies a pre-defined area that includes the geographic location of the mobile device.

5. The method of claim 1, wherein the data specifying the entity includes an entity description describing the entity, and an entity name of the entity.

6. The method of claim 5, wherein the entity is a business entity.

7. The method of claim 5, wherein the entity is a landmark entity.

8. The method of claim 1, wherein the second model is a convolutional neural network.

9. A method implemented in a mobile device, comprising:
storing, on the mobile device, a first model that has been trained to approximate an output of a second model that classifies, according to a classification scheme, image data received as input, wherein the first model includes a plurality of connected layers including an output layer, an input layer, and a plurality of intermediate layers;
sending, to a computer system that is external to the mobile device, a request for entity entries in a database managed by the computer system, the request including location data specifying a geographic location of the mobile device, wherein each entity entry includes:
location data specifying a geographic location;
data specifying an entity located at the geographic location; and
one or more embeddings generated by the first model at the computer system, each of the one or more embeddings generated from one or more images received as input to the first model, and each of the images being an image that depicts the entity at the geographic location, and wherein each embedding are data generated by one of the intermediate layers;
receiving, from the computer system, a proper subset of the entity entries in the database, the proper subset selected based on the geographic location of the mobile device, and storing the proper subset of the entity entries on the mobile device;
capturing an image by the mobile device and providing the image as input to the first model to generate a captured image embedding;
determining a set of matching embeddings in the proper subset of the entity entries, each matching embedding being an embedding that is determined to match the captured image embedding according to a match criterion;
selecting, based on the set of matching embeddings, an entity entry in the proper subset of the entity entries as a matching entity entry; and
providing, on a display device of the mobile device, display data describing the entity of the matching entity entry.

10. The method of claim 9, wherein selecting, based on the set of matching embeddings, the entity entry in the proper subset of the entity entries as the matching entity entry comprises:
for each entity entry having a matching embedding, determining a distance value based on the location data for the entity entry and the location data for the mobile device; and
selecting the entity entry have a smallest distance value relative to the distance values of the other entity entries having a matching embedding.

11. The method of claim 9, wherein providing display data describing the entity of the matching entity entry comprises:
selecting a display location on the captured image; and
displaying the display data on the captured image at the display location.

12. The method of claim 11, wherein selecting a display location on the captured image comprises:
determining, from the captured image embedding, an activation value that is a highest value relative to other activation values in the captured image embedding; and
selecting the display location that corresponds to the highest activation value in the captured image embedding.

13. The method of claim 12, wherein the captured image is one of a plurality of image frames captured by the mobile device, and the determining the set of matching embeddings in the proper subset of the entity entries, the selecting the display location that corresponds to the activation value in the captured image embedding, and the displaying the display data on the captured image at the display location are done for the plurality of image frames.

14. The method of any of claim 11, wherein:
the captured image is one of a plurality of image frames captured by the mobile device; and
the determining the set of matching embeddings in the proper subset of the entity entries, the selecting an entity entry in the proper subset of the entity entries as a matching entity entry, and the providing the display data describing the entity of the matching entity entry, are done for the plurality of image frames.

15. The method of claim 9, further comprising:
receiving, from the computer system, a further proper subset of the entity entries in the database, the further proper subset selected based on an updated geographic location of the mobile device, and storing the further proper subset of entity entries on the mobile device;

capturing a further image by the mobile device and providing the further image as input to the first model to generate a further captured image embedding;

determining a set of matching embeddings in the further proper subset of the entity entries, each matching embedding being an embedding that is determined to match the further captured image embedding according to a match criterion;

selecting, based on the set of matching embeddings, an further entity entry in the further proper subset of the entity entries as a further matching entity entry; and providing, on the display device of the mobile device, display data describing the entity of the further matching entity entry.

16. The method of claim 15, further comprising:

deleting, from the mobile device, the proper subset of the entity entries when the mobile device is determined to be in the updated geographic location.

17. A system, comprising:

a data processing apparatus; and a non-transitory computer readable storage medium in data communication with the data processing apparatus and storing instructions executable by the data processing apparatus and upon such execution cause the data processing apparatus to perform operations comprising:

accessing a first model that has been trained to generate an output that classifies, according to a classification scheme, image data received as input;

using the first model to train a second model to approximate the output of the first model to classify, according to the classification scheme, image data received as input, wherein the second model includes a plurality of connected layers including an output layer, an input layer, and a plurality of intermediate layers; and after the second model is trained:

accessing map data that specifies a plurality of geographic locations, wherein each geographic location in at least a subset of the geographic locations is associated with an entity located at the geographic location and one or more images that depict the entity at the geographic location;

for each geographic location associated with an entity:

for each image of the one or more images that depict the entity located at the geographic location, providing the image to the second model to generate an embedding for the image, wherein the embedding are data generated by one of the intermediate layers;

associating each of the one or more embeddings generated by the second model with the geographic location; and storing, in a database, location data specifying the geographic location, the associated one or more embeddings, and data specifying the entity, as an associated entity entry for the entity.

18. A non-transitory computer storage medium encoded with a computer program, the computer program comprising instructions that when executed by a data processing apparatus cause the data processing apparatus to perform operations comprising:

accessing a first model that has been trained to generate an output that classifies, according to a classification scheme, image data received as input;

using the first model to train a second model to approximate the output of the first model to classify, according to the classification scheme, image data received as input, wherein the second model includes a plurality of connected layers including an output layer, an input layer, and a plurality of intermediate layers; and after the second model is trained:

accessing map data that specifies a plurality of geographic locations, wherein each geographic location in at least a subset of the geographic locations is associated with an entity located at the geographic location and one or more images that depict the entity at the geographic location;

for each geographic location associated with an entity:

for each image of the one or more images that depict the entity located at the geographic location, providing the image to the second model to generate an embedding for the image, wherein the embedding are data generated by one of the intermediate layers;

associating each of the one or more embeddings generated by the second model with the geographic location; and storing, in a database, location data specifying the geographic location, the associated one or more embeddings, and data specifying the entity, as an associated entity entry for the entity.

19. A system, comprising:

a data processing apparatus; and a non-transitory computer readable storage medium in data communication with the data processing apparatus and storing instructions executable by the data processing apparatus and upon such execution cause the data processing apparatus to perform operations comprising:

storing, on a mobile device, a first model that has been trained to approximate an output of a second model that classifies, according to a classification scheme, image data received as input, wherein the first model includes a plurality of connected layers including an output layer, an input layer, and a plurality of intermediate layers;

sending, to a computer system that is external to the mobile device, a request for entity entries in a database managed by the computer system, the request including location data specifying a geographic location of the mobile device, wherein each entity entry includes:

location data specifying a geographic location;

data specifying an entity located at the geographic location; and one or more embeddings generated by the first model at the computer system, each of the one or more embeddings generated from one or more images received as input to the first model, and each of the images being an image that depicts the entity at the geographic location, and wherein each embedding are data generated by one of the intermediate layers;

receiving, from the computer system, a proper subset of the entity entries in the database, the proper subset selected based on the geographic location of the mobile device, and storing the proper subset of the entity entries on the mobile device;

capturing an image by the mobile device and providing the image as input to the first model to generate a captured image embedding;

determining a set of matching embeddings in the proper subset of the entity entries, each matching embedding being an embedding that is determined to match the captured image embedding according to a match criterion;

selecting, based on the set of matching embeddings, an entity entry in the proper subset of the entity entries as a matching entity entry; and providing, on a display device of the mobile device, display data describing the entity of the matching entity entry.

20. A non-transitory computer storage medium encoded with a computer program, the computer program comprising instructions that when executed by a data processing apparatus cause the data processing apparatus to perform operations comprising:

storing, on a mobile device, a first model that has been trained to approximate an output of a second model that classifies, according to a classification scheme, image data received as input, wherein the first model includes a plurality of connected layers including an output layer, an input layer, and a plurality of intermediate layers;

sending, to a computer system that is external to the mobile device, a request for entity entries in a database managed by the computer system, the request including location data specifying a geographic location of the mobile device, wherein each entity entry includes:

location data specifying a geographic location;

data specifying an entity located at the geographic location; and one or more embeddings generated by the first model at the computer system, each of the one or more embeddings generated from one or more images received as input to the first model, and each of the images being an image that depicts the entity at the geographic location, and wherein each embedding are data generated by one of the intermediate layers;

receiving, from the computer system, a proper subset of the entity entries in the database, the proper subset selected based on the geographic location of the mobile device, and storing the proper subset of the entity entries on the mobile device;

capturing an image by the mobile device and providing the image as input to the first model to generate a captured image embedding;

determining a set of matching embeddings in the proper subset of the entity entries, each matching embedding being an embedding that is determined to match the captured image embedding according to a match criterion;

selecting, based on the set of matching embeddings, an entity entry in the proper subset of the entity entries as a matching entity entry; and providing, on a display device of the mobile device, display data describing the entity of the matching entity entry.

* * * * *